S. N. KNIGHT
Water-Wheels.

No. 158,591.   Patented Jan. 12, 1875.

Witnesses  
Jno. L. Boone  
E. M. Richardson

Inventor  
Samuel N. Knight  
by Dewey & Co  
Atty's

UNITED STATES PATENT OFFICE.

SAMUEL N. KNIGHT, OF SUTTER CREEK, CALIFORNIA.

IMPROVEMENT IN WATER-WHEELS.

Specification forming part of Letters Patent No. 158,591, dated January 12, 1875; application filed November 21, 1874.

*To all whom it may concern:*

Be it known that I, SAMUEL N. KNIGHT, of Sutter Creek, Amador county, State of California, have invented an Improved Water-Wheel; and I do hereby declare the following description and accompanying drawings are sufficient to enable any person skilled in the art or science to which it most nearly appertains to make and use my said invention or improvement without further invention or experiment.

My invention consists in a novel form of bucket to be used on that class of water-wheels which are known as hurdy-gurdy wheels; and in the manner of attaching them to the wheel-rim, so as to materially increase the effectiveness of the wheel and reduce its cost of construction.

In order to explain my invention with sufficient accuracy, reference is had to the accompanying drawing forming a part of this specification, in which—

Figure 1:
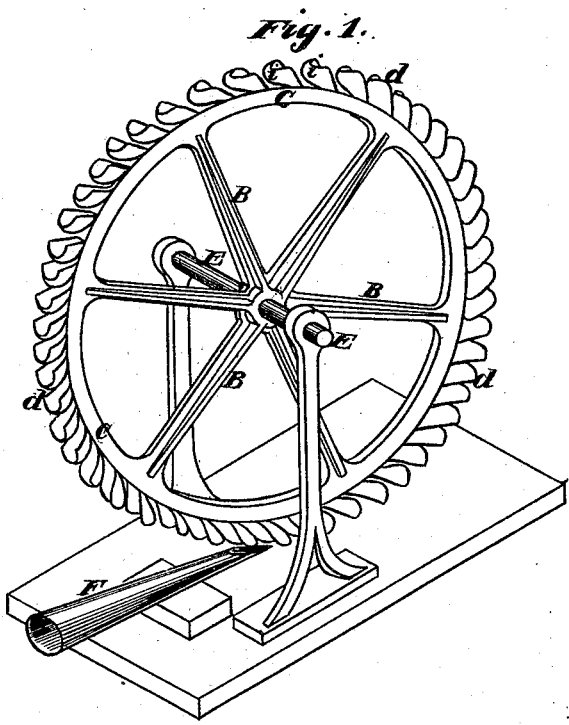
Figure 2:
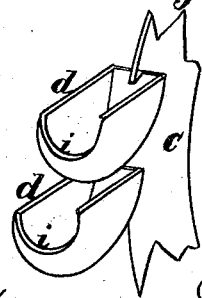

Figure 1 is a perspective view of my invention. Fig. 2 is an enlarged view of some of the buckets.

A represents the hub, B the spokes, and C the rim, of a cast-iron wheel. Around the rim C of this wheel I secure wrought-iron or equivalent pressed or forged buckets $d\ d\ d$, as below stated.

In this class of water-wheels the wheel is secured upon a horizontal shaft, E, so that it rotates in a vertical plane; and the water is delivered upon the buckets by a nozzle, F, which may be arranged to deliver the stream upon the buckets at any desired point in the circumference of the wheel-rim. The comparative effectiveness of the wheel will, therefore, depend on the capacity of the buckets to utilize the force of the water as it leaves the nozzle, it being necessary that the buckets be not only capable of receiving the force of the entire stream, but also that they free themselves easily the moment the force of the water is expended.

The buckets $d\ d\ d$ I make of wrought-iron, and they can be either forged or pressed into the desired shape. These buckets are made scoop-shaped, and the base of the scoop, or outer side of each bucket which is farthest from the wheel-rim, is cut out in a semicircular form, as at $i$, so as to provide a sufficient opening for the entrance of the stream of water into the buckets, while their sides extend upward close to the bucket next above. These buckets I secure very close together, so that as the outer edge of each bucket commences to pass the stream from the nozzle the water will strike into the next bucket. Each bucket is firmly secured to the rim of the wheel, so that the bottom of the scoop will stand at an angle to the rim, as shown.

The stream of water will strike into the buckets, and, in its reaction, will be discharged, thus giving the wheel an impetus which is not affected by dead water; and this action being continuous, on account of the arrangement of the buckets, the full force of the water will be expended to the greatest advantage.

Having thus described my invention, what I claim, and desire to secure by Letters Patent, is—

A water-wheel, having the scoop-shaped buckets $d\ d\ d$ secured to its outer rim C, as above described, each of said buckets having a semicircular recess, $i$, in its outer side, substantially as and for the purpose above described.

In witness whereof I hereunto set my hand and seal.

SAMUEL N. KNIGHT. [L. S.]

Witnesses:
 JNO. L. BOONE,
 C. M. RICHARDSON.